United States Patent [19]

Yoshida et al.

[11] Patent Number: 5,247,808
[45] Date of Patent: Sep. 28, 1993

[54] AUTOMOTIVE AIR CONDITIONING APPARATUS

[75] Inventors: Makoto Yoshida, Kusatsu; Yoshiyuki Morikawa, Otsu; Norio Yoshida, Moriyama; Akira Nakazawa, Kusatsu, all of Japan

[73] Assignee: Matsushita Electric Industrial Co., Ltd., Osaka, Japan

[21] Appl. No.: 900,938

[22] Filed: Jun. 17, 1992

[30] Foreign Application Priority Data

Jun. 17, 1991 [JP] Japan .................... 3-144469

[51] Int. Cl.⁵ ............................................. F25B 27/00
[52] U.S. Cl. ..................................... 62/228.4; 62/230;
62/323.3; 322/90
[58] Field of Search ................. 62/228.4, 230, 243,
62/323.3; 322/7, 8, 90, 93; 307/16

[56] References Cited

U.S. PATENT DOCUMENTS

| | | | |
|---|---|---|---|
| 4,262,242 | 4/1981 | Glennon | 322/90 X |
| 4,364,237 | 12/1982 | Cooper et al. | 62/228.4 X |
| 4,692,684 | 9/1987 | Schaeffer | 322/90 |
| 4,736,595 | 4/1988 | Kato | 62/230 X |
| 4,870,833 | 10/1989 | Matsuda et al. | 62/230 X |
| 5,086,266 | 2/1992 | Shiga et al. | 322/90 X |

*Primary Examiner*—Harry B. Tanner
*Attorney, Agent, or Firm*—Wenderoth, Lind & Ponack

[57] ABSTRACT

An automotive air conditioning system equipped with an electrical compressor uses a single-shaft, dual output generator to provide a low voltage output to drive existing 12-V or 24-V automotive electrical equipment and a high voltage output to drive the air conditioning motor-driven compressor, and a control device to control the electrical compressor.

2 Claims, 3 Drawing Sheets

AUTOMOTIVE AIR CONDITIONING APPARATUS

BACKGROUND OF THE INVENTION

The present invention relates an automotive air conditioning apparatus having an electrical compressor.

Recent automotive air conditioning systems use an electrical compressor which is controlled to provide air conditioning inside the vehicle irrespective of to the engine speed. An automotive air conditioning system of this type is disclosed in Japanese patent S63-57316 and described below with reference to FIGS. 1 and 2.

This system is installed in a bus 21 having a rear-mounted drive engine 22. A generator 23 is connected to the drive shaft of the engine 22 by means of an electromagnetic clutch 24. The air conditioning unit 25 comprises the components required by the cooling cycle. The electrical power needed by the air conditioning unit 25 is provided by the generator 23 and conducted over electrical lines 26.

Conditioned air from the air conditioning unit 25 is supplied to the bus interior through ducts 27 mounted on the ceiling of the bus 21. The air conditioning unit 25 comprises an inverter 28 which receives the electricity produced by the generator 23. The compressor 29 produces the cooling cycle, and features a sealed structure with a built-in sealed drive motor.

The other components of the air conditioning unit 25 include the external air heat exchanger 30, internal air heat exchanger 31, cooling fan 32 and 33 for the heat exchangers, respectively, and an expansion means 34 provided in the cooling cycle between the external air heat exchanger 30 and internal air heat exchanger 31. The compressor 29 and fans 32 and 33 are driven by the electricity produced by the generator 23 and frequency adjusted by the inverter 28.

The control panel 35 that controls the inverter 28 and the electromagnetic clutch 24 is connected to these components by electrical wires 36 and 37.

The driver can thus operate the control panel 35 to control the air conditioning system whenever the engine 22 is running, and the control commands from the control panel 35 are relayed over electrical wires 36 and 37 to operate the electromagnetic clutch 24 and inverter 28.

When the electromagnetic clutch 24 is engaged, the generator 23 is driven by the engine 22 to produce electricity. Because the electrical power frequency changes with the engine 22 speed, the electrical power produced by the generator 23 is supplied to the inverter 28 to be converted to the appropriate frequency.

This frequency adjusted electrical power is then used to drive the compressor 29 and fans 32 and 33. The coolant is thus circulated by the compressor 29 through the external air heat exchanger 30, expansion means 34, and internal air heat exchanger 31, and the bus interior is air conditioned by the operation of the internal air heat exchanger 31.

As thus described, there are existing systems which have an integral generator to drive a compressor, and control the compressor speed independently of the engine speed to air condition the interior of the vehicle.

In a conventional automotive air conditioning system of this type, however, it is necessary to either provide a separate high voltage generator for the air conditioning system in addition to the normal low voltage generator used to power other on-board electrical equipment, or to provide a large capacity electrical converter. In either case, however, more space is required for the electrical power supply.

SUMMARY OF THE INVENTION

Therefore, an object of the present invention is to provide a compact, lightweight, space-saving automotive air conditioning apparatus comprising an electrical compressor.

To achieve this object, an automotive air conditioning apparatus according to the present invention comprises a single-shaft, dual output generator wherein a common magnetic field generated by a single rotor rotationally driven by the engine drive power acts on the stator to produce two outputs of different voltages, an electrical compressor with a built-in motor driven by an electrical input power, a control device for controlling the speed of the electrical compressor according to ambient conditions inside and environmental conditions outside the vehicle, the output state of the single-shaft, dual output generator, and the electrical load, and a drive device for driving the electrical compressor according to the control signal from the control device.

Furthermore, one output from the single-shaft, dual output generator is a low voltage output of either 12 V or 24 V, and the other output is a high voltage output that is greater than the output voltage of the low voltage output and is used to drive the electrical compressor.

By means of this construction, the low voltage output of the single-shaft, dual output generator is used to drive existing automotive electrical equipment, and the other output is used to drive the electrical compressor. It is therefore not necessary to add a separate generator or power converter for the air conditioning system, and a compact, lightweight, space-saving automotive air conditioning system can be achieved.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiment of a automotive air conditioning apparatus according to the present invention is described hereinbelow with reference to the accompanying figures.

Figure 1:
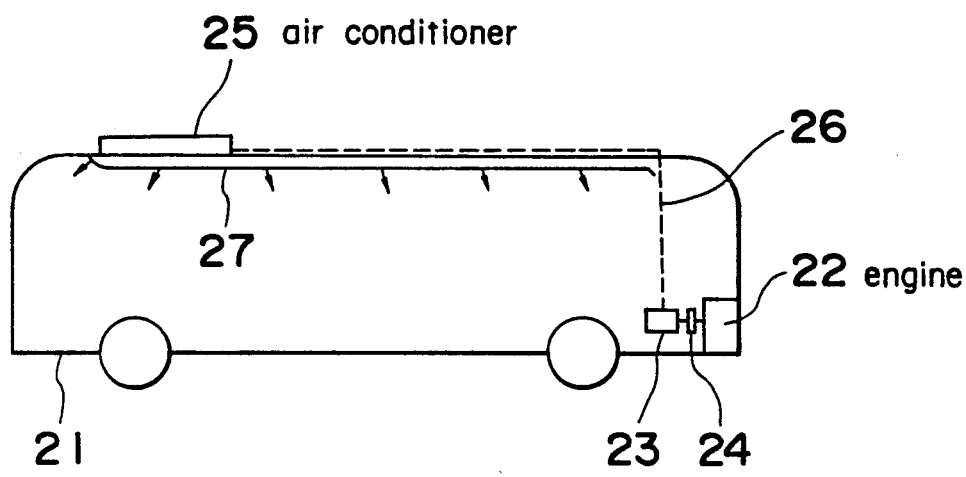
FIG. 1 is a diagram of a bus equipped with a conventional automotive air conditioning system.
Figure 2:
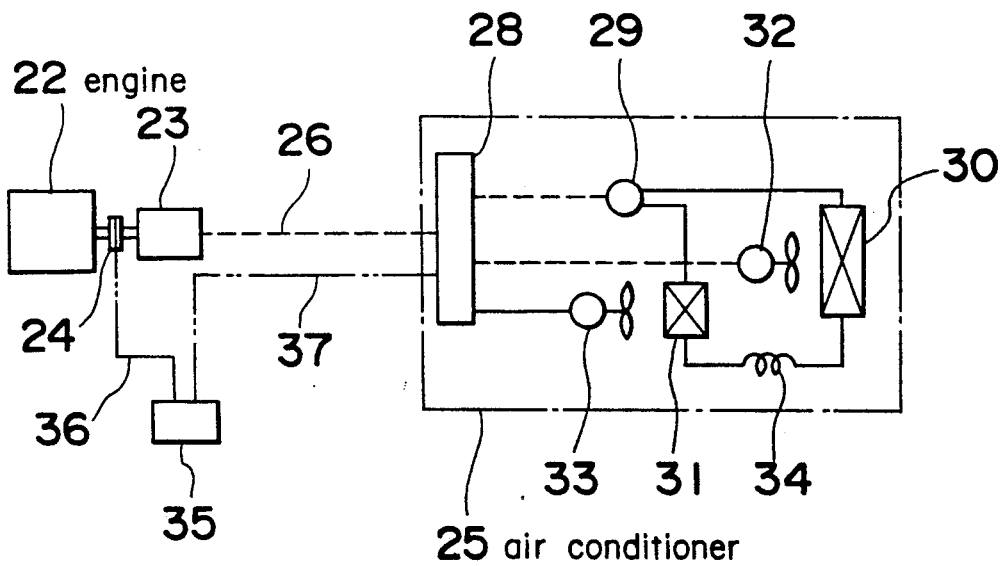
FIG. 2 is a block diagram of the conventional automotive air conditioning system.
Figure 3:
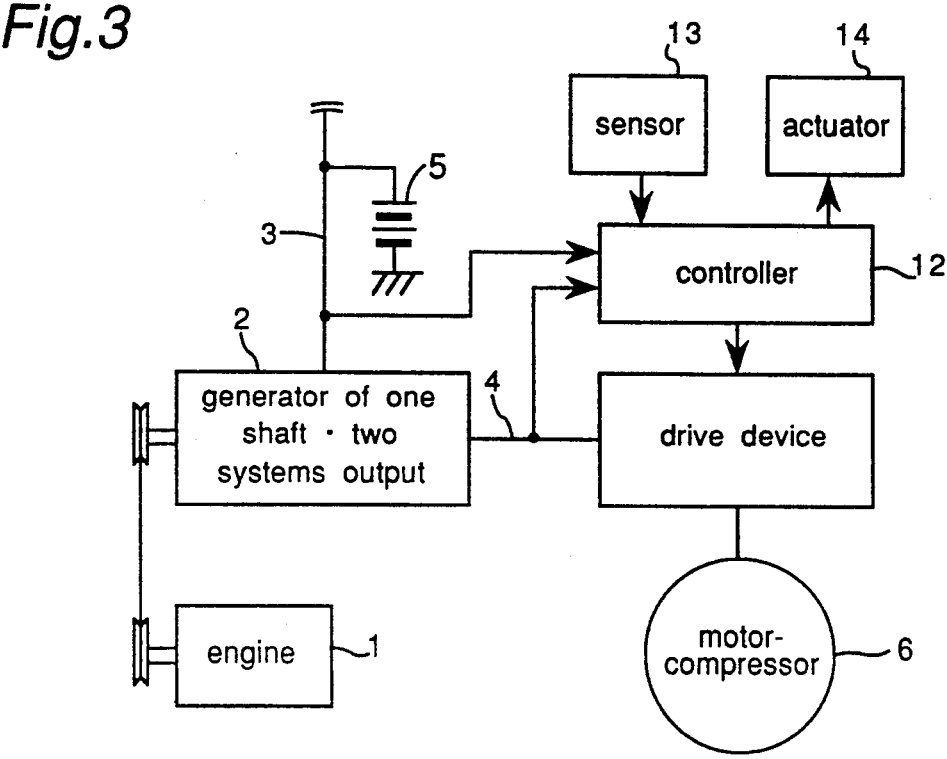
FIG. 3 is a block diagram of the preferred embodiment of an automotive air conditioning apparatus according to the present invention.

As shown in FIG. 3, a block diagram of an automotive air conditioning apparatus according to the present invention, the single-shaft, dual output generator 2 is driven by the engine 1 and outputs a low voltage output 3 and high voltage output 4. The low voltage output 3 is connected to the battery 5, and is used as the power supply for existing 12-V electrical equipment. The high voltage output 4 is used as the drive power supply for the electrical compressor 6.

The control device 12 controls the air conditioning actuators 14 based on the signals from the sensors 13, and controls the electrical compressor 6 according to the output state of the low voltage output 3 and high voltage output 4 of the single-shaft, dual output generator 2 and according to the electrical loads. For example, assume a state where the rotational number of the engine is constant, and during this state the electrical load of the low voltage output 3 is increased for some reason. Since the rotational number of the engine is constant, and since accordingly the total maximum generating capacity of the single-shaft, dual output generaor is constant, the control device 12 controls the drive device to lower the rotational number of the motor compressor 6 to thereby lower the electrical load of the high voltage system output 4. Conversely, if during this same state, the electrical load of the low voltage system output 3 is decreased, the control device 12 increase the electrical load of the high voltage system output 4 by causing the drive device to increase the rotational number of the motor compressor 6. In addition, the control device 12 is responsive to a lowering of the rotational number of the engine, which lowers the total maximum generating capacity of the single-shaft, dual output generator 2, to lower the rotational number of the motor compressor 6.

Figure 4:
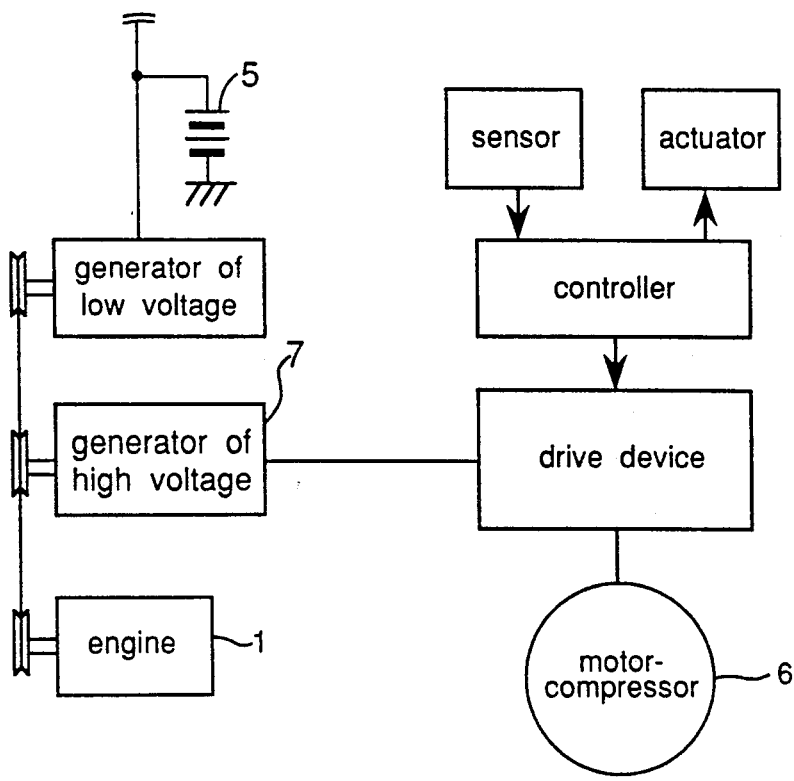
FIG. 4 is a block diagram of a conventional automotive air conditioning system used for comparison with the automotive air conditioning apparatus of the invention.

The construction of the automotive air conditioning apparatus shown in FIG. 3 can be easily compared with that of the conventional automotive air conditioning system shown in FIG. 4, which requires the addition of a high voltage generator 7 as the power supply for the electrical compressor 6. As is evident from a comparison of FIGS. 3 and 4, the automotive air conditioning apparatus of the present invention does not require the addition of a separate generator for air conditioning, and is therefore more compact, weighs less, and saves space.

Figure 5:
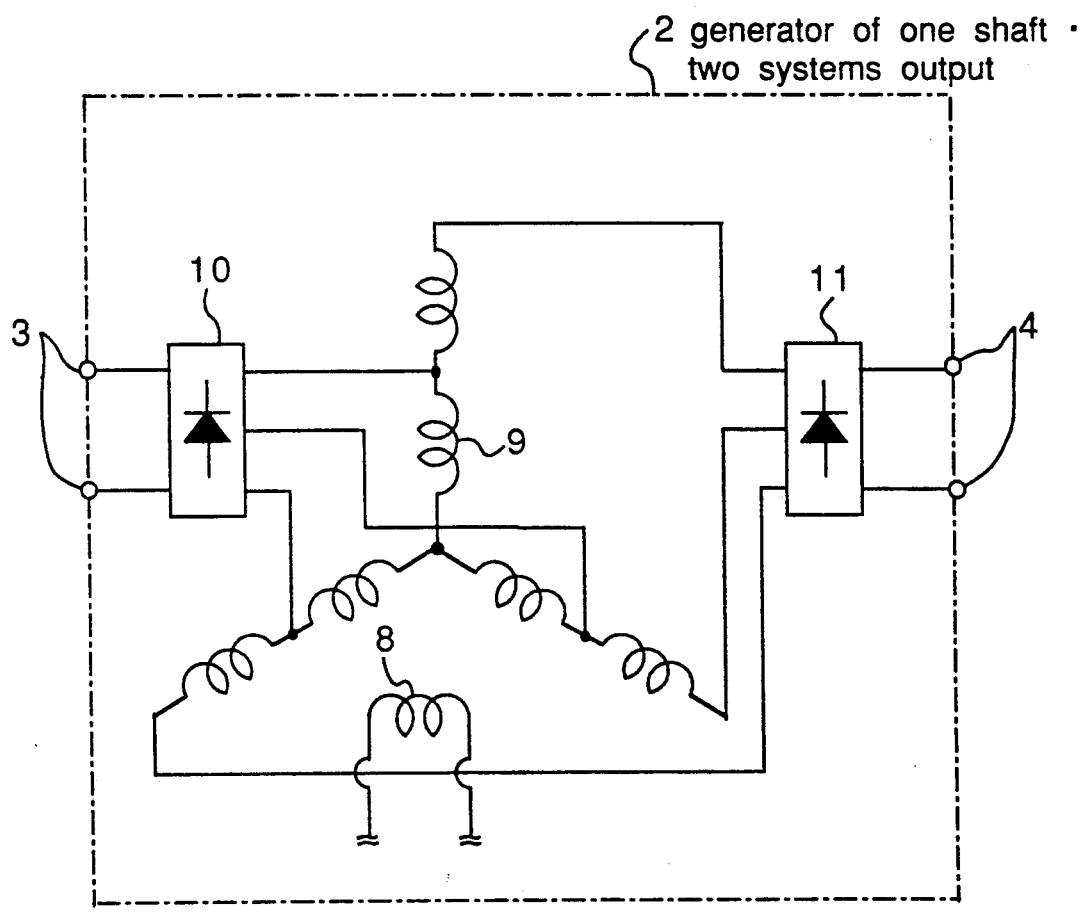
FIG. 5 is a circuit diagram of the single-shaft, dual output generator used in the automotive air conditioning apparatus according to the preferred embodiment of the present invention.

As shown in the schematic diagram of FIG. 5, the single-shaft, dual output generator 2 comprises a low voltage output 3 and a high voltage output 4, a rotor coil 8, stator coil 9, and diode bridges 10 and 11 for the low and high voltage outputs, respectively.

An automotive air conditioning apparatus according to the present invention thus provides a space-saving, compact, lightweight automotive air conditioning system that does not require a separate generator or electrical converter for air conditioning due to the provision of a single-shaft, dual output generator wherein a common magnetic field generated by a single rotor rotationally driven by the engine drive power acts on the stator to produce two outputs of different voltages, an electrical compressor with a built-in motor driven by an electrical input power, a control device for controlling the speed of the electrical compressor according to the ambient conditions inside and the environmental conditions outside the vehicle, the output state of the single-shaft, dual output generator, and the electrical load, and a drive device for driving the electrical compressor according to the control signal from the control device. This automotive air conditioning apparatus can also be applied in passenger cars with relatively little available space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioning apparatus for an automobile, comprising:

a single-shaft, dual output generator having a single rotor which is rotationally driven by an engine of said automobile to generate a common magnetic field and a stator which is responsive to said common magnetic field to produce first and second outputs of different voltages;

an electrical compressor having a built-in motor which is driven by an electrical input power;

a drive device for receiving said second output from said single-shaft, dual output generator so as to supply said electrical compressor with said electrical input power in accordance with a control signal; and, a control device for supplying said control signal to said drive device in accordance with ambient conditions inside and environmental conditions outside said automobile and in accordance with said first and second outputs of said single-shaft, dual output generator, wherein said control device controls an electrical load of at said second output of said single-shaft, dual output generator by controlling a rotational number of said electrical compressor in accordance with a variation in an electrical load at said first output of said single-shaft, dual output generator and in accordance with a total generating capacity of said single-shaft, dual output generator which varies according to a rotational number of said engine of said automobile.

2. The air conditioning apparatus as claimed in claim 1, wherein a voltage of said first output of said single-shaft, dual output generator is 12 volts or 24 volts and less than a voltage of said second output, and wherein said drive device derives said electrical input power from said second output of said single-shaft, dual output generator.

* * * * *